US006753927B2

(12) United States Patent
Shtyrenkov

(10) Patent No.: US 6,753,927 B2
(45) Date of Patent: Jun. 22, 2004

(54) TELEVISION INTERFACE FOR HANDHELD CALCULATOR FOR ENHANCED TELEVISION DISPLAY

(75) Inventor: Mikhail Y. Shtyrenkov, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 389 days.

(21) Appl. No.: 09/835,687

(22) Filed: Apr. 16, 2001

(65) Prior Publication Data

US 2001/0035913 A1 Nov. 1, 2001

Related U.S. Application Data

(60) Provisional application No. 60/204,611, filed on May 16, 2000.

(51) Int. Cl.⁷ .................................................. H04N 7/01
(52) U.S. Cl. ...................... 348/552; 348/563; 348/441; 345/169; 345/2.2; 345/2.1
(58) Field of Search ............................... 348/552, 553, 348/563, 729, 567, 569, 441, 445, 555, 556, 558; 345/2.1, 2.2, 2.3, 169, 440, 157, 440.1; 708/105, 109, 130, 139

(56) References Cited

U.S. PATENT DOCUMENTS

| 3,801,741 | A | * | 4/1974 | Ablett | 348/79 |
|---|---|---|---|---|---|
| 4,151,596 | A | * | 4/1979 | Howells | 708/141 |
| 4,236,152 | A | * | 11/1980 | Masuzawa et al. | 345/440.1 |
| 4,259,668 | A | * | 3/1981 | Nishimura et al. | 345/169 |
| 4,396,941 | A | * | 8/1983 | Nishimura et al. | 348/552 |
| 4,475,164 | A | * | 10/1984 | Sado | 708/109 |
| 4,639,225 | A | * | 1/1987 | Washizuka | 434/308 |
| 4,812,828 | A | * | 3/1989 | Nishi et al. | 345/157 |
| 4,944,578 | A | * | 7/1990 | Denison | 349/6 |
| 5,307,055 | A | * | 4/1994 | Baskin et al. | 345/2.2 |
| 5,528,263 | A | * | 6/1996 | Platzker et al. | 345/156 |
| 5,539,658 | A | * | 7/1996 | McCullough | 345/730 |
| 5,818,425 | A | * | 10/1998 | Want et al. | 345/158 |
| 6,057,830 | A | * | 5/2000 | Chan et al. | 345/157 |
| 6,330,021 | B1 | * | 12/2001 | Devaux | 348/14.04 |
| 6,580,422 | B1 | * | 6/2003 | Reilly | 345/169 |
| 6,661,465 | B2 | * | 12/2003 | Zhu et al. | 348/552 |

* cited by examiner

Primary Examiner—Michael H. Lee
Assistant Examiner—Jean W. Désir
(74) Attorney, Agent, or Firm—Charles A. Brill; Wade James Brady, III; Frederick J. Telecky, Jr.

(57) ABSTRACT

An interface (10) for connecting a calculator (12) to a standard television (11), so that the calculator's display can be re-displayed on the television (1). The interface also receives input from a pointing device (10a) such as a mouse, which permits the areas of the television display to be pointed to, highlighted, or otherwise manipulated.

36 Claims, 4 Drawing Sheets

TELEVISION INTERFACE FOR HANDHELD CALCULATOR FOR ENHANCED TELEVISION DISPLAY

This application claims priority under 35 U.S.C. § 119 (e)(1) of provisional application No. 60/204,611 filed May 16, 2000.

TECHNICAL FIELD OF THE INVENTION

This invention relates to handheld calculators, and more particularly to an interface for reformatting calculator display signals so that they are suitable for display on a television and also for adding additional content to the display, such as input from a pointing device or a display of the calculator keypad.

BACKGROUND OF THE INVENTION

Electronic calculators have become an essential tool for everyone. Consumers have a wide choice of calculator types and models.

Many persons own relatively inexpensive scientific calculators with one or two line displays, but recently more and more persons are discovering the advantages of "big-screen" calculators characterized by a two-dimensional display screen capable of displaying graphs and other graphical images. These calculators are often called "graphing calculators" because the popularity of these calculators for use in teaching various types of graphs and plots.

Calculators with these larger display screens are especially popular for educational applications. When these calculators are used in a classroom, it is often desired to duplicate the calculator display on an even larger screen suitable for viewing by an entire room full of students. The conventional approach is to use an overhead projector for such displays.

SUMMARY OF THE INVENTION

One aspect of the invention is an interface that receives display data input from a calculator and outputs a video signal, for use by a video device such as a television. A processing unit and program memory cooperate to receive the display data from the calculator and to reformat the data as video data. The processing unit is also programmed to receive input from a pointing device, such as a mouse. Input data from the pointing device is processed so as to permit areas of the video image to be pointed to, highlighted, or otherwise manipulated.

Enhancements of the interface include the addition of a display of the keypad. The interface can be programmed so that the pointing device can be used to make selections from keypad display, thereby providing simulated operation of the calculator. The interface can be further programmed to provide a display of keystroke sequences.

An advantage of the invention is that it permits an instructor to point to areas on the television screen. This helps focus the attention of students on the matter being taught. Simultaneous display of the both calculator display and the keypad on the television screen helps students to better follow the instructor and to more effectively learn to use the calculator.

DETAILED DESCRIPTION OF THE INVENTION

Figure 1:
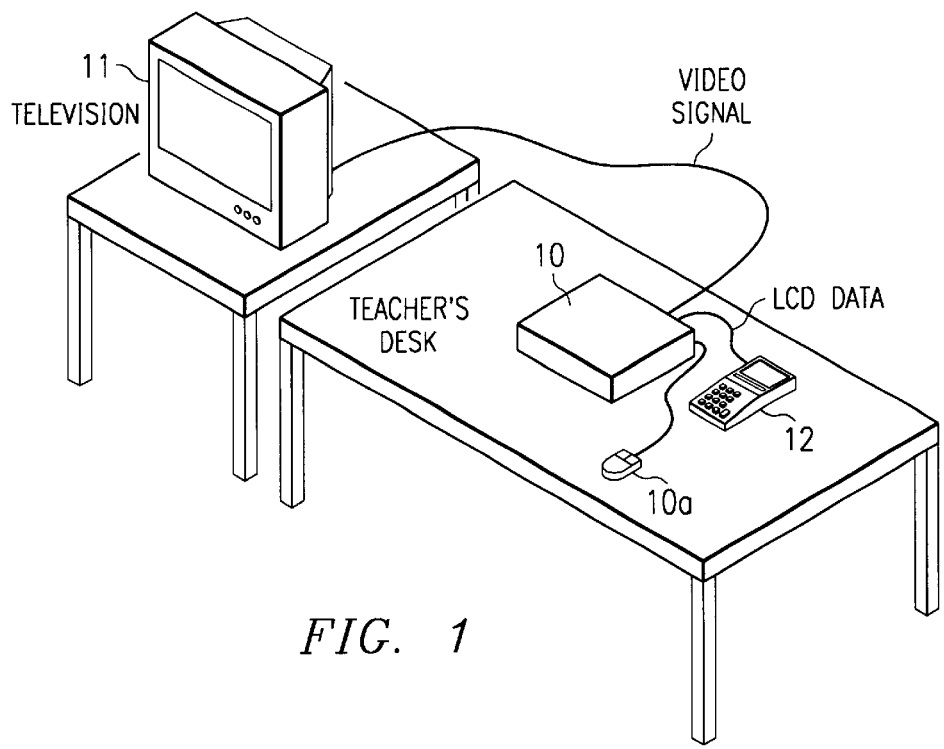
FIG. 1 is a block diagram of a graphing calculator connected to a television, using an interface in accordance with the invention.

Television Display of Calculator Screen FIG. 1 illustrates how an interface 10 in accordance with the invention may be used to re-display a calculator screen on a television 11. As explained below, interface 10 permits displays from calculator 12 to be re-displayed or recorded in real time.

In the example application of FIG. 1, the television 11 is used in a classroom to display the screen of a calculator 12. Interface 10 is operated by a teacher and is located on the teacher's desk.

Television 11 is a conventional television, configured to receive scan-type television signals, such as NTSC or PAL signals. In other embodiments, television 11 could be another type of video display or recording device, such as a VCR, video camera, or video projector with composite video input. These devices are referred to collectively herein as "video devices".

Calculator 12 may be any calculator having a two-dimensional screen display. As discussed in the Background, this type of calculator has become synonymous with "graphing calculators". A feature of the invention is that interface 10 is not limited to a calculator 12 having a particular display format; it is easily configurable for operation with different types of calculators with different display formats.

A typical calculator 12 has an LCD (liquid crystal display) screen of 64×96 pixels. It also has a processor, memory, keypad, and various I/O interfaces. In addition to the ability to draw graphical displays of various types, typical software features of calculator 12 are the capability for stacked fractions, constant features, English and metric conversions, data loading and storage, and keystroke programming. A user interface displays various menus, prompts, and error messages to the user, as well as receives commands, functions, and settings from the user.

It is assumed that calculator 12 has a display connector for delivering LCD data to interface 10. Examples of calculators with which interface 10 may be used are the following calculators, all manufactured by Texas Instruments Incorporated: TI-73, TI-82, TI-83, TI85, TI-86, TI-89, and TI-92, each equipped with a display connector, such as the ViewScreen connector also manufactured by Texas Instruments Incorporated.

Interface 10 receives LCD data from calculator 12. It delivers a video signal to television 11 via a standard composite video connection. The connection to television 11 may be via a VCR or an RF modulator. A special SCART adapter may be used for televisions in Europe that have an SCART video-in port. In response to the video signal from interface 10, television 11 generates a display that is a duplicate of the display on calculator 12.

In some embodiments, interface 10 may be programmed to add additional content to the calculator display. For example, graphic user interface objects, such as pointers, menus, and buttons, may be added. A mouse (hand operated input device) 10a may be used to navigate and enter commands. As explained below in connection with FIG. 8, interface 10 may be further programmed to provide a keypad display, using data stored in memory 26a.

In the embodiment of FIG. 1, interface 10 may be powered by AC household current, using a power cord connected to a wall outlet. In other embodiments, interface 10 could be battery operated.

Figure 2:
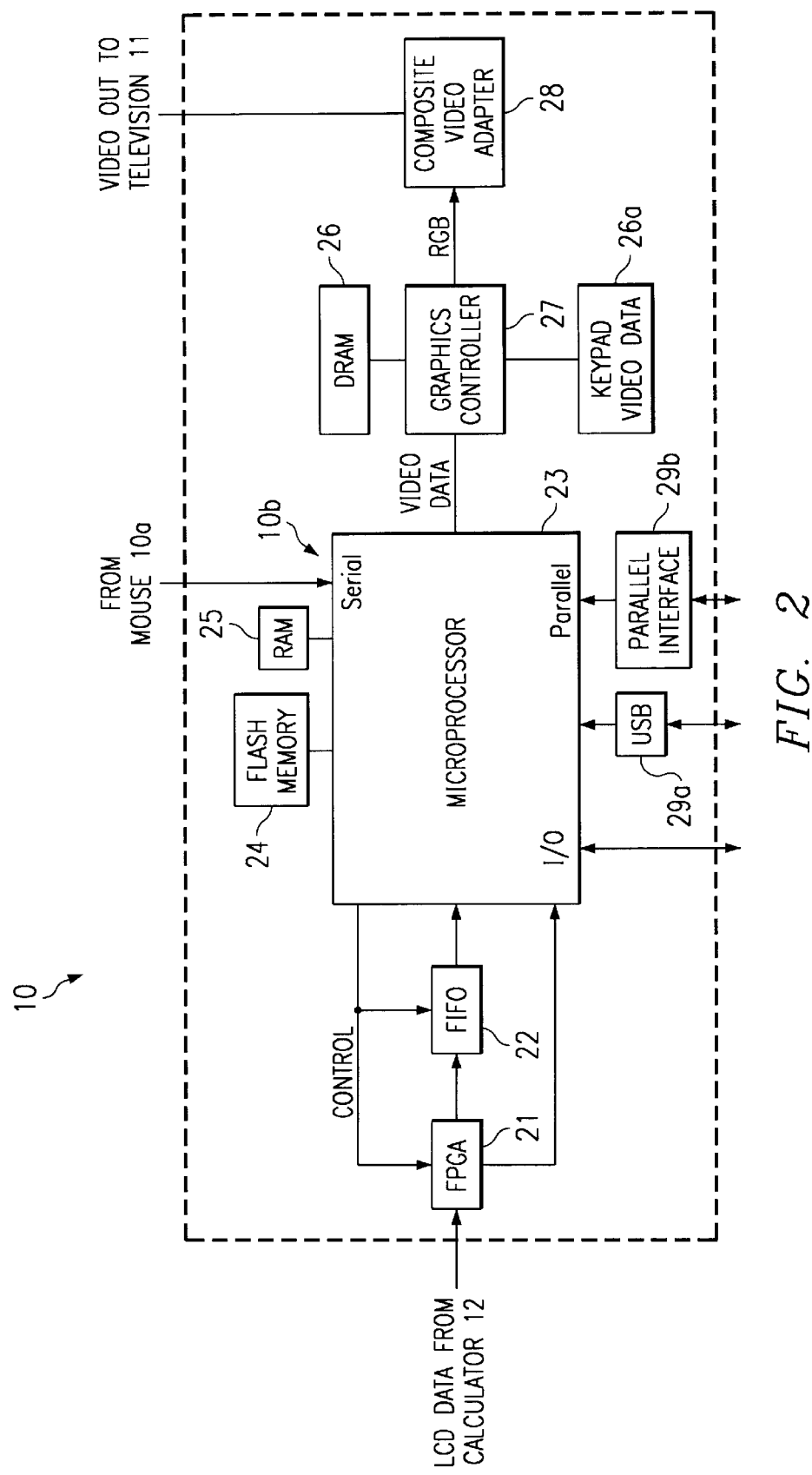
FIG. 2 is a block diagram of the interface of FIG. 1.

FIG. 2 is a block diagram of one embodiment of the internal components of interface 10.

FPGA (field programmable gate array) 21 receives LCD data from calculator 10. As explained below, for a given type of LCD data received by interface 10, the tasks involved in reformatting the signal for display on television 11 are divided between FPGA 21 and processor 23. Other devices equivalent to FPGA 21 could be used, with a common characteristic being the ability to either reconfigure or reprogram the device to perform "hardwired" formatting tasks for a given type of calculator display. In the former case, a different portion of a pre-programmed device might be used. In the latter case, the device may be reprogrammed for a new type of LCD data input signal. A more general term for such devices is "programmable logic device".

FIFO 22 buffers data to permit real time processing to be accomplished with a relatively low speed processor 23. As an alternative to FIFO 22, FPGA 21 might have sufficient circuitry to accomplish buffering.

Processor 23 executes programming to reformat the incoming LCD data to a video format. The portions of its programming that it executes for any one type of calculator 12 may vary from that executed for a different calculator having a different display format. As stated above, processor 23 may be programmed to perform tasks in addition to reformatting that is the subject of this invention, such as the addition of additional content to the display. However, for purposes of this description, only those tasks important to reformatting are discussed herein. Processor 23 may be implemented with any general purpose microprocessor, with an example of a suitable device being a 16-bit microprocessor.

Flash memory 24 is a flash PROM memory device, which may receive new programming for interface 10. In this manner, software repairs and upgrades may be easily made to FPGA 21 or to processor 23. RAM 25 stores additional programming for processor 23. In other embodiments, the programming for FPGA 21 and processor 23 could be downloaded to, or pre-stored in, other types of memory devices.

Graphics controller 27 converts the data from processor 23 to a standard RGB signal. An example of a suitable graphics controller 27 is one that provides a signal in accordance with the SVGA standard.

Composite video adapter 28 converts the RGB signal into a composite video signal. As stated above, typically the video signal will be in either the NTSC or PAL format.

The use of both graphics controller 27 and video adapter 28 assumes a television 11 that is configured to receive NTSC or PAL analog video signals. In other embodiments, a different television 11, such as one using an HDTV standard, might use one or more different adapters to convert the output of processor 23 to a form useable by the television. In general, the function of adapters such as graphics controller 27 and video adapter 28 is to provide synchronization signals and any digital-to-analog conversion.

USB port 29a and parallel port 29b permit interface 10 to communicate with other processor-based equipment, such as a personal computer. A serial port provides input from mouse 10a. An I/O port permits programming to be loaded to memory of interface 10.

Figure 3:
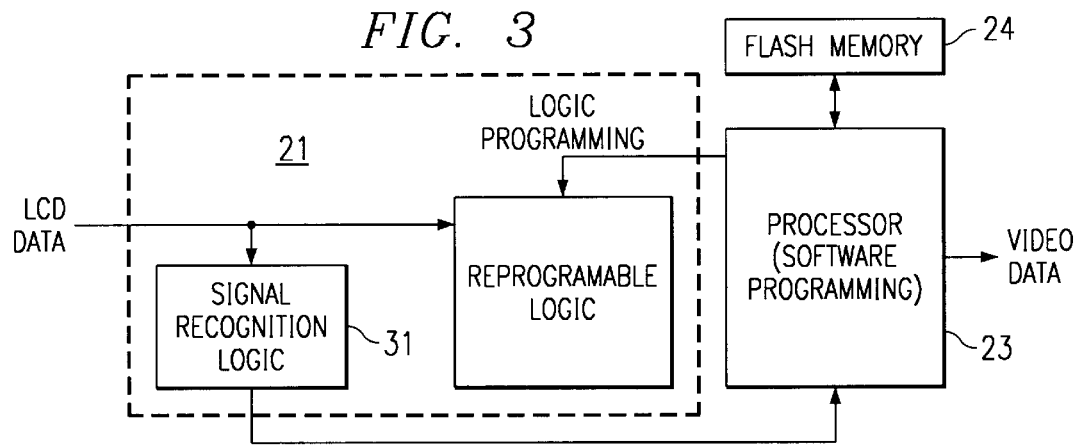
FIG. 3 is a functional block diagram of the processing elements of FIG. 2.

FIG. 3 is a functional block diagram of FPGA 21 and processor 23. As explained below, "hard logic" processing tasks are performed by FPGA 21, whereas "software" processing tasks are performed by processor 23. The delineation of which tasks are considered "hard logic" tasks and which are considered "software" tasks varies, depending on the type of input signal.

In operation, interface 10 automatically detects the display format of the particular calculator 12 connected to it. Specifically, in the example of FIG. 3, FPGA 21 has signal recognition logic 31 that receives the LCD data and determines its type. It then delivers a signal to processor 23, indicating the signal type. Processor 23 then accesses flash memory 24, and delivers the appropriate programming for that display format to FPGA 21. FPGA 21 is now configured with the proper circuitry for processing that format type. As explained below, in other embodiments, processor 23 might perform the signal recognition or FPGA 21 might be configured by selecting a pre-programmed portion of its circuitry".

As an example of format detection, the incoming LCD data might come in on a multi-pin connection, of which a subset of pins can be used to recognize the display type. The signal recognition logic 31 might have sufficient circuitry to receive and analyze these pins only.

In other embodiments, the signal recognition logic 31 might merely route an appropriate portion of the LCD data to processor 23. In this case, the actual signal detection would be performed by processor 23.

Once the signal type is detected, the display dimensions, frame rate, and other characteristics of the incoming display signal are known. For a given format, processing tasks are divided between FPGA 21 and processor 23. In general, the division of tasks between FPGA 21 and processor 23 is such that FPGA 21 performs one of three levels of a "task pyramid": routing, routing and buffer control, or routing and buffer control as well as some interpretation.

Task partitioning between FPGA 21 and processor 23 is based on the type of signal. For example, interface 10 may receive either "pixel" LCD data or "command" LCD data.

An LCD data input signal that is of the "pixel" type comprises a stream of pixel data bits, perhaps in parallel with additional control data. A set number of bits, say 4 bits, represents pixel data. A calculator using this format would have a "dumb" driver, which simply places the image on the screen.

Figure 4:
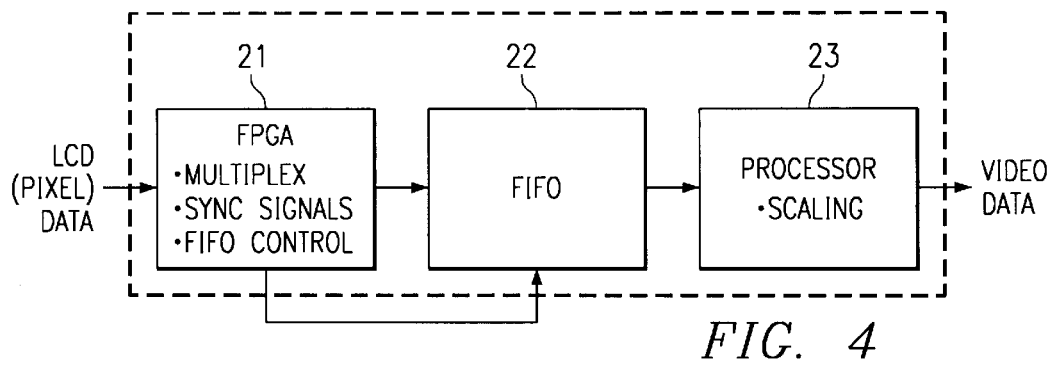
FIG. 4 illustrates division of processing tasks for pixel type input display data.

As illustrated by the example of FIG. 4, for pixel type input data, FPGA 21 is used to provide synchronization signals. For example, the incoming data may have a frame rate different from that to be provided by processor 23. The synchronization signal would permit the processor 23 to synchronize frames.

An LCD data input signal that is the "command" type comprises display commands that are to be interpreted for generating the display. A calculator using this format has a processor-based "smart" driver that interprets the commands to generate the image. An advantage of command type display format is that the display need not be continually refreshed.

Figure 5:
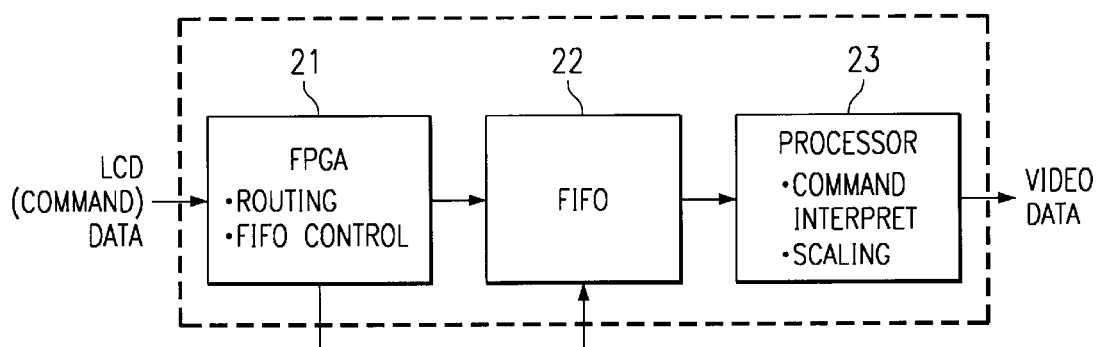
FIG. 5 illustrates division of processing tasks for command type input display date.
Figure 6:
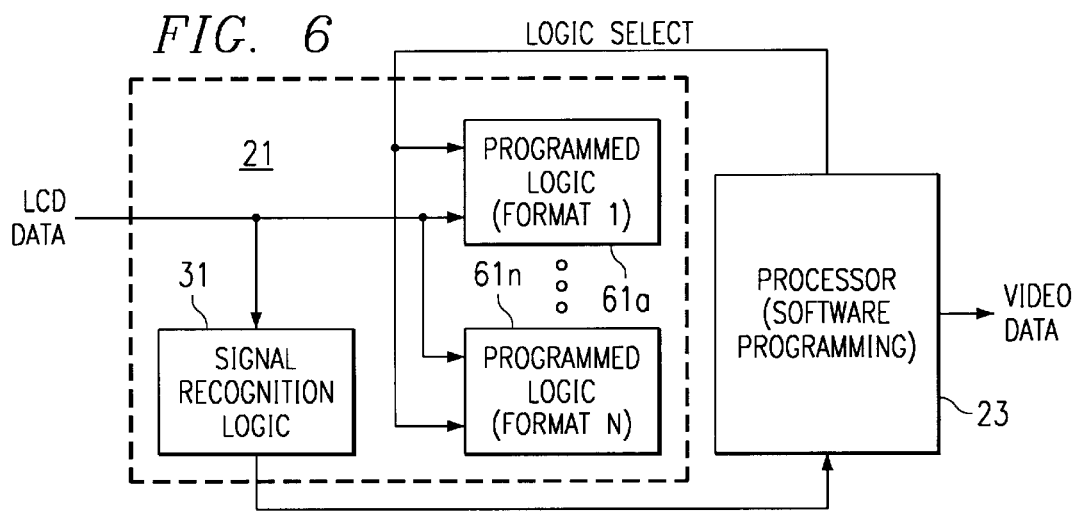
FIG. 6 is an alternative embodiment of the processing elements, with the logic device having pre-programmed units for different display formats.

As illustrated in FIG. 5, for command type input data, one example of task partitioning is to program FPGA 21 to simply route the data to processor 23. Processor 23 would then be programmed to emulate the smart driver of the calculator by interpreting the commands. Thus, in this approach, the display data formatting is an emulation that is primarily performed with processor software rather than by FPGA hardware.

Task partitioning between FPGA 21 and processor 23 might also be based on the processing speed of processor 24. The display standard of television 11 (i.e., NTSC or PAL) dictates a certain output data rate. FPGA 21 can be used to assist processor 23 in providing a sufficient data rate. In the case of pixel type input data, FPGA 21 might be used to multiplex two 4-bit data words to 8-bit data words. In the case of the command type input data, FPGA 21 could be used to perform some of the command interpretation tasks.

For both pixel type and command type input data, FPGA 21 is used to provide buffer control signals for FIFO 22. The timing of these control signals depends on the format type.

The output of processor 23 is a pixel representation of the calculator display in a format suitable for display in television 11. In general, this means pixel data having the correct resolution and color information. For example, processor 23 may be required to perform scaling or interpolation tasks to provide a greater number of pixel rows and pixels per row. This data is stored in DRAM 26 for access by whatever adapter(s) are to be used.

FIG. 4 illustrates an alternative embodiment of the invention. In comparison to the embodiment of FIG. 3, where FPGA 21 is re-programmed "on the fly", in FIG. 4 different parts of FPGA are programmed for different display formats. A first unit 41a processes Format 1, with additional units for Formats 2, 3, . . . N. Once the format type is detected, processor 23 delivers a control signal to selection logic 42, which directs the LCD data to the proper unit 41a–41n.

Enhanced Television Display; Input from Pointing Device; Keyboard Representation FIGS. 1–6 illustrate various embodiments of an interface 10 that may be used to generate video data representing a calculator screen image. As explained below, this interface 10, or other interfaces having different architectures, may be used to generate additional content for the television display, such as pointers and keyboard displays. For purposes of example herein, the interface is assumed to have the general characteristics of interface 10 described above. In other words, the interface has a processing unit (such as FPGA 21 and processor 23) and program memory (such as flash memory 24 and RAM 25). However, the enhanced display features could be implemented with other processor and memory architectures, such as an architecture based on a processor without an FPGA or an architecture that serves a single type of calculator input.

Referring again to FIG. 2, interface 10 may have a connector 10b for connection with a mouse 10a or other hand held pointing device. Examples of other types of pointing devices are trackballs and various proprietary mechanisms seen especially on laptop computers. An example of a suitable connector 10b is one designed to receive serial data. The interface between connector 10b and processor 23 may be akin to the serial or bus interfaces used for personal computers.

Mouse 10a has one or more buttons for making selections on the television screen. It is assumed that processor 23 is programmed with a suitable driver for the pointing device, which translates electrical signals from the mouse into positional information and information that represents the status of the buttons.

Figure 7:
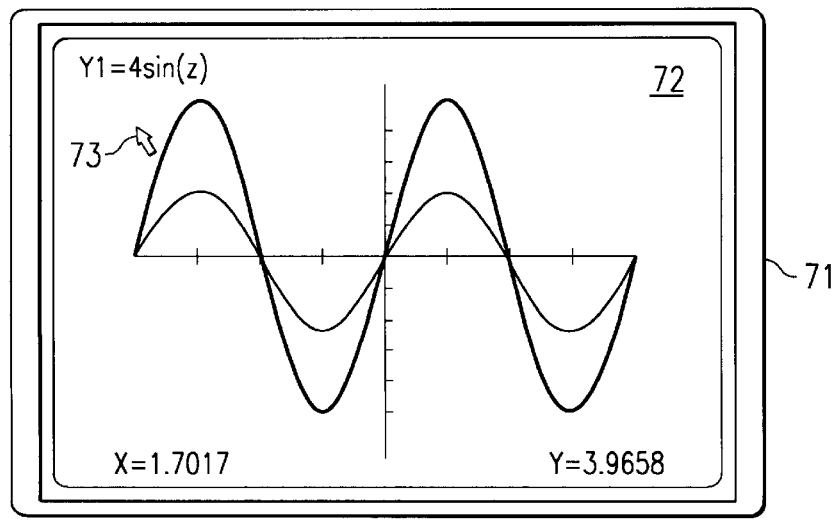
FIG. 7 illustrates a television display having a first window for displaying the calculator screen and input from a pointing device.

FIG. 7 illustrates a television screen 71 that is displaying a calculator display 72. As explained above, the input data for display 72 is received from an operating calculator 12. A pointer 73 may be moved within display 72 by operating mouse 10a. The button(s) of mouse 10a may be used for selecting an area of display 72 in a manner similar to the operation of pointers in today's graphical user interfaces of personal computers. Areas may be selected and blocked. Software features may be added to the processing capability of processor 23 so that areas on display 72 may be highlighted, hidden, or otherwise manipulated.

Figure 8:
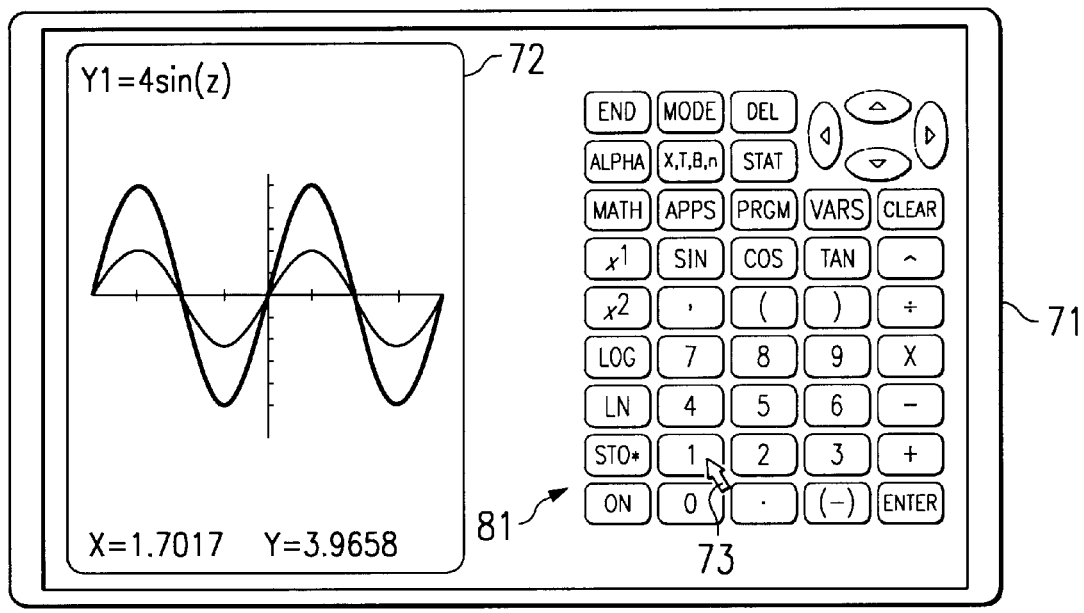
FIG. 8 illustrates a television display having a first window for displaying the calculator screen and a second window for displaying a representation of the calculator keyboard.

FIG. 8 illustrates television screen 71 with a keypad display 81 that represents the calculator keypad, as well as the calculator display 72. In contrast to the calculator display 72, where the input data is received from calculator 12, the keypad display 81 is generated from image data stored in memory 26a of interface 10.

Display 72 and 81 may be implemented as "windows" in a manner similar to the windows of today's personal computer displays. Mouse 10a is operable such that the pointer 73 may be moved between display 72 and display 81. Keypad display 81 is relatively "static" as compared to calculator display 72, although mouse 10a may be used to highlight or otherwise show key operation and sequences. Thus, DRAM 26 and memory 26a may operate as separate image buffers. Additional programming, such as for numbering of keys in a key sequence, may be added to the memory accessible by processor 23.

The keypad display 81 may be used together with mouse 10a to provide an interactive keypad display. The operator of mouse 10a may select operate calculator 12 by selecting keys on display 81. In other words, mouse 10a and display 81 provide a "simulated" alternative to the actual keypad of calculator 12.

Figure 9:
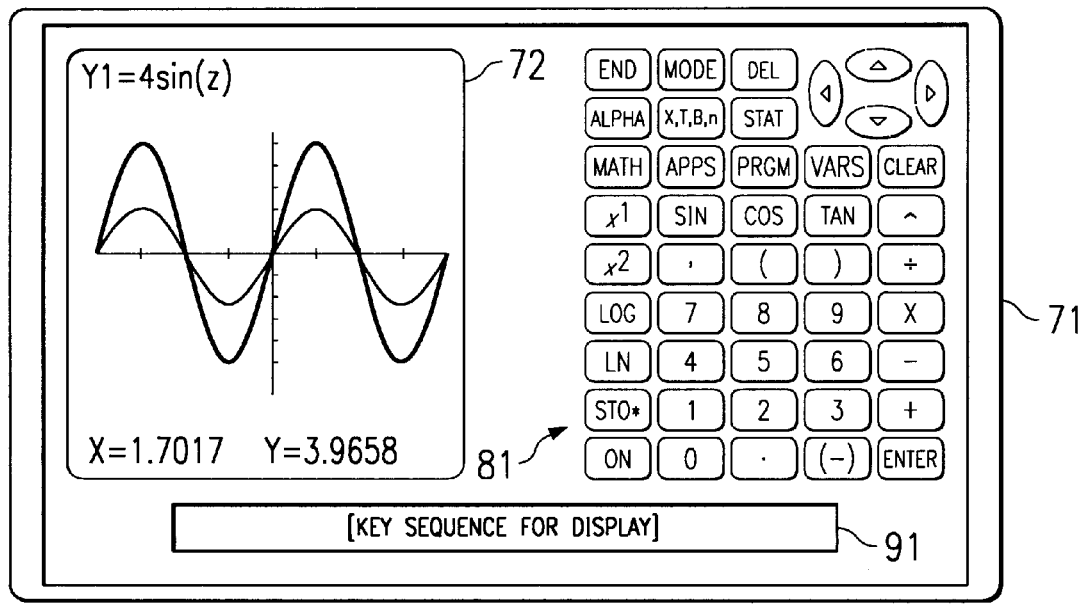
FIG. 9 illustrates the display of FIG. 8 with the addition of a keystroke sequence window.

FIG. 9 illustrates how the interactive features of interface 10 may be further enhanced by the addition of a key sequence window 91. One use of window 91 might be to "predisplay" a certain keystroke sequence, with mouse 10a being used to select keys from within window 91. Another use of window 91 could be to display each key as it is selected from display 81, thereby providing a keystroke history.

Other Embodiments

Although the present invention has been described in detail, it should be understood that various changes, substitutions, and alterations can be made hereto without departing from the spirit and scope of the invention as defined by the appended claims.

What is claimed is:

1. An interface that receives display data input from a calculator and outputs video data, and that is used with a pointing device, comprising:

a processing unit;

memory for storing programming for the processing unit, such that the processing unit is operable to determine a calculator display type and to convert the display data from the calculator to video data in a format suitable for display by a video device, thereby generating a calculator screen image; and a connector for connecting the pointing device to the interface;

wherein the memory further stores programming such that the processing unit is operable to receive input from the pointing device and to generate video data that represents movement of a pointer within the calculator screen image.

2. The interface of claim 1, wherein the pointing device has one or more buttons and the processing unit is further operable to receive button input for making selections.

3. The interface of claim 1, wherein the processing unit is further operable to generate video data for manipulating areas on the calculator screen image.

4. The interface of claim 1, wherein the processing unit is further operable to generate video data for a keypad image in addition to the calculator screen image.

5. The interface of claim 4, wherein the processing unit is further operable to receive input from the pointing device representing selections on the keypad image and to process the input to simulate operation of the calculator.

6. The interface of claim 4, further comprising a buffer for the keypad display and a buffer for the calculator screen display.

7. The interface of claim 1, wherein the processing unit is further operable to generate a display of a keypad sequence.

8. An interface that receives display data input from a calculator and outputs video data, and that is used with a pointing device, comprising:

a programmable logic device that receives the display data from the calculator and performs hard logic processing of the display data;

a processor that receives partially processed display data from the logic device, performs software processing of the display data, and outputs video data that represents a calculator screen image and that has a format suitable for display by a video device;

memory for storing programming for the processor;

wherein the processor is further operable to receive input from the pointing device and to generate video data that represents movement of a pointer within the calculator screen image and wherein the programmable logic device is further operable to determine the type of display format used by the calculator and to deliver a format identifier signal to the processor.

9. The interface of claim 8, wherein the logic device is a field programmable gate array.

10. The interface of claim 8, wherein the programmable logic device is further operable to separate a portion of the display data, and wherein the processor uses the portion of the display data to determine the type of display format and delivers a control signal to the programmable logic device that determines the processing to be performed by the logic device.

11. The interface of claim 8, wherein the pointing device has one or more buttons and the processor is further operable to receive button input for making selections.

12. The interface of claim 8, wherein the processor is further operable to generate video data for manipulating areas on the calculator screen image.

13. The interface of claim 8, wherein the processor is further operable to generate video data for a keypad image in addition to the calculator screen image.

14. The interface of claim 13, wherein the processor is further operable to receive input from the pointing device representing selections on the keypad image and to process the input to simulate operation of the calculator.

15. The interface of claim 13, further comprising a buffer for the keypad display image and a buffer for the calculator screen image.

16. The interface of claim 8, wherein the processor is further operable to generate a display of a keypad sequence.

17. A method of reformatting a display data signal from a calculator for a video device, comprising the steps of:

receiving the display data signal from the calculator;

determining a calculator display type;

reformatting the display data to a video format suitable for the video device, thereby generating video data that represents a calculator screen image;

receiving input from a pointing device; and generating video data that represents movement of a pointer within the calculator screen image.

18. The method of claim 17, further comprising the step of generating video data that represents a keypad of the calculator, receiving input from the pointing device representing selections on the keypad, and processing the input to simulate operation of the calculator.

19. The method of claim 17, further comprising the step of generating video data that represents a keystroke sequence.

20. An interface that receives display data input from a calculator and outputs video data, and that is used with a pointing device, comprising:

a programmable logic device that receives the display data from the calculator and performs hard logic processing of the display data;

a processor that receives partially processed display data from the logic device, performs software processing of the display data, and outputs video data that represents a calculator screen image and that has a format suitable for display by a video device;

memory for storing programming for the processor;

wherein the processing unit is further operable to receive input from the pointing device and to generate video data that represents movement of a pointer within the calculator screen image, wherein the programmable logic device is further operable to separate a portion of the display data, and wherein the processor uses the portion of the display data to determine the type of display format and delivers a control signal to the programmable logic device that determines the processing to be performed by the logic device.

21. The interface of claim 20, wherein the logic device is a field programmable gate array.

22. The interface of claim 20, wherein the programmable logic device is further operable to determine the type of display format used by the calculator and to deliver a format identifier signal to the processor.

23. The interface of claim 20, wherein the pointing device has one or more buttons and the processing unit is further operable to receive button input for making selections.

24. The interface of claim 20, wherein the processing unit is further operable to generate video data for manipulating areas on the calculator screen image.

25. The interface of claim 20, wherein the processing unit is further operable to generate video data for a keypad image in addition to the calculator screen image.

26. The interface of claim 25, wherein the processing unit is further operable to receive input from the pointing device representing selections on the keypad image and to process the input to simulate operation of the calculator.

27. The interface of claim 25, further comprising a buffer for the keypad image and a buffer for the calculator screen display.

28. The interface of claim 20, wherein the processing unit is further operable to generate a display of a keypad sequence.

29. An interface between a calculator and a display device, the interface comprising:
- means for receiving display data from the calculator and performing hard logic processing of the display data;
- means for receiving partially processed display data;
- means for determining the type of display format used by the calculator,
- means for outputting video data for display by the display device, the video data representing a calculator screen image;
- means for indicating a location on the display device;
- means for receiving input from the means for indicating; and
- means for generating video data that represents movement of the means for indicating within the calculator screen image.

30. The interface of claim 29, wherein the means for receiving display data comprises a field programmable gate array.

31. The interface of claim 29, wherein the means for indicating has one or more buttons and means for receiving button input for making selections.

32. The interface of claim 29, further comprising means for generating video data for manipulating areas on the calculator screen image.

33. The interface of claim 29, comprising means for generating video data for a keypad image.

34. The interface of claim 33, further comprising means for receiving input representing selections on the keypad image from the means for indicating and processing the input to simulate operation of the calculator.

35. The interface of claim 33, further comprising means for buffering the keypad image and means for buffering the calculator screen image.

36. The interface of claim 29, further comprising means for generating a display of a keypad sequence.

\* \* \* \* \*